US009065232B2

(12) United States Patent
Li et al.

(10) Patent No.: US 9,065,232 B2
(45) Date of Patent: Jun. 23, 2015

(54) COMMUTATOR HAVING CONDUCTIVE RINGS

(75) Inventors: Yue Li, Hong Kong (CN); Mao Xiong Jiang, Shenzhen (CN); Yong Wang, Shenzhen (CN); Hai Hui Xiang, Shenzhen (CN); Ya Ming Zhang, Shenzhen (CN); Jian Zhao, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 401 days.

(21) Appl. No.: 13/540,336

(22) Filed: Jul. 2, 2012

(65) Prior Publication Data

US 2013/0002089 A1 Jan. 3, 2013

(30) Foreign Application Priority Data

Jun. 30, 2011 (CN) .......................... 2011 1 0185520

(51) Int. Cl.
*H02K 13/02* (2006.01)
*H02K 13/04* (2006.01)
*H01R 39/04* (2006.01)
*H01R 39/06* (2006.01)
*H02K 13/00* (2006.01)

(52) U.S. Cl.
CPC ............... *H01R 39/06* (2013.01); *H01R 39/04* (2013.01); *H02K 13/003* (2013.01); *H02K 13/006* (2013.01)

(58) Field of Classification Search
CPC ...... H01R 39/04; H01R 39/06; H02K 13/003; H02K 13/006

USPC ............................ 310/232, 233, 236; 29/597
IPC ....................... H01R 39/04; H02K 13/02,13/04
See application file for complete search history.

(56) References Cited

U.S. PATENT DOCUMENTS

| 2,880,402 | A | * | 3/1959 | Gardner .......................... 439/20 |
| 3,937,993 | A | | 2/1976 | Noodleman |
| 4,425,536 | A | * | 1/1984 | Larsen ..................... 318/400.37 |
| 4,716,330 | A | * | 12/1987 | Heyraud ....................... 310/233 |
| 6,396,175 | B2 | | 5/2002 | Fujita et al. |
| 2007/0046225 | A1 | * | 3/2007 | Ahmed .......................... 318/254 |
| 2013/0002089 | A1 | * | 1/2013 | Li et al. ......................... 310/232 |

FOREIGN PATENT DOCUMENTS

| CN | 2781635 Y | 5/2006 |
| JP | 4200259 A | 7/1992 |
| JP | 2006074906 A | 3/2006 |
| JP | 2010252614 A | 11/2010 |

* cited by examiner

*Primary Examiner* — John K Kim
(74) *Attorney, Agent, or Firm* — Muncy, Geissler, Olds & Lowe, P.C.

(57) ABSTRACT

A commutator includes a substantially tubular insulating core, a first slip ring fixed to the core, a plurality of first bars electrically connected to the first slip ring, a second slip ring fixed to the core, and a plurality of second bars electrically connected to the second slip ring. The first bars and the second bars are fixed to the outer surface of the core and are alternately arranged at equally spaced intervals in the circumferential direction of the core. The first slip ring and the second slip ring are arranged on the same side of the first bars and the second bars. The first and second slip rings respectively comprise a contact surface that is substantially perpendicular to the axis of the commutator and is configured for contacting brushes.

14 Claims, 4 Drawing Sheets

COMMUTATOR HAVING CONDUCTIVE RINGS

CROSS REFERENCE TO RELATED APPLICATIONS

This non-provisional patent application claims priority under 35 U.S.C. §119(a) from Patent Application No. 201110185520.0 filed in The People's Republic of China on Jun. 30, 2011.

FIELD OF THE INVENTION

This invention relates to a commutator and in particular, to a commutator for use in a direct current electric motor.

BACKGROUND OF THE INVENTION

Direct current (DC) electric motors having a permanent magnet rotor, wound stator coils, a commutator and brushes are generally known as shown in Japanese patent publication JP4-200259. This patent publication discloses a cylindrical commutator that includes a pair of slip rings and a number of commutator bars extending axially from each slip ring. The slip rings make continuous sliding contact with a first pair of brushes that are respectively connected to two poles of a DC power source. A second pair of brushes that are connected to the coils, make sliding alternating contact with the commutator bars as the rotor turns. However, this kind of commutator is long in the axial direction.

The present invention aims to provide a new commutator which can mitigate the above mentioned problem.

SUMMARY OF THE INVENTION

Accordingly, in one aspect thereof, the present invention provides a commutator comprising: a substantially tubular insulating core; a first slip ring fixed to the core; a plurality of first bars electrically connected to the first slip ring; a second slip ring fixed to the core; and a plurality of second bars electrically connected to the second slip ring; wherein the first bars and the second bars are fixed to the outer surface of the core and are alternately arranged at equally spaced intervals in the circumferential direction of the core, the first slip ring and the second slip ring are arranged on the same side of the first bars and the second bars; the first and second slip rings respectively comprise a contact surface that is substantially perpendicular to the axis of the commutator and is configured for contacting brushes.

Preferably, the first bars are integrally formed with the first slip ring as a single piece stamping, and the second bars are integrally formed with the second slip ring as a single piece stamping.

Preferably, the first slip ring is spaced from the second slip ring in the axial direction of the commutator.

Preferably, the core comprises an end plate and a tubular body substantially perpendicular to the end plate, the end plate is sandwiched between the first and second slip rings, and the first and second bars are fixed to the outer surface of the tubular body.

Preferably, the first slip ring is disposed on a side of the end plate that faces away from the tubular body, the second slip ring is disposed on a side of the end plate that faces towards the tubular body, and the first bars extend through the end plate.

Preferably, the outer diameter of the second slip ring is greater than that of a circle formed by the first and second bars, the outer diameter of the first slip ring is greater than that of the second slip ring.

Preferably, the second slip ring is surrounded by the first slip ring.

Preferably, the outer diameter of the first slip ring is substantially equal to that of a circle formed by the first bars and the second bars.

Preferably, the first slip ring comprises a ring-shaped extension axially extending from an edge thereof, the first bars comprise a protrusion axially protruding from an axial end thereof, the protrusions are surrounded by and electrically connected to the extension.

In embodiments of the present invention, due to the first and second slip rings being arranged on the same side of the first and second bars, the commutator is short in the axial direction thereof.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
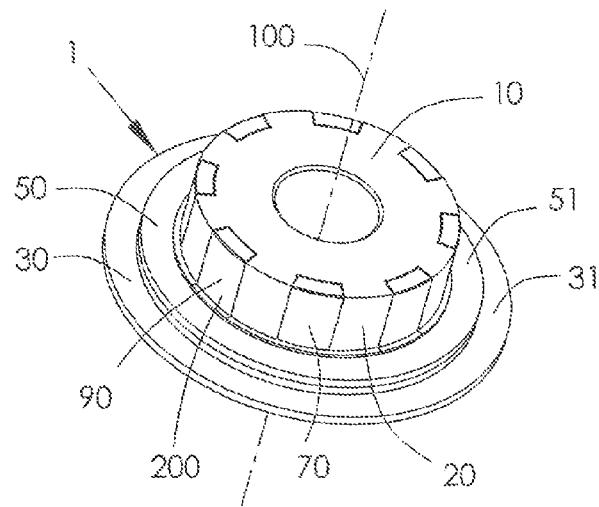
FIG. 1 is a view of a commutator, according to a first embodiment of the present invention, which includes a insulating core, a first slip ring, a second slip ring, a number of first bars, and a number of second bars.
Figure 2:
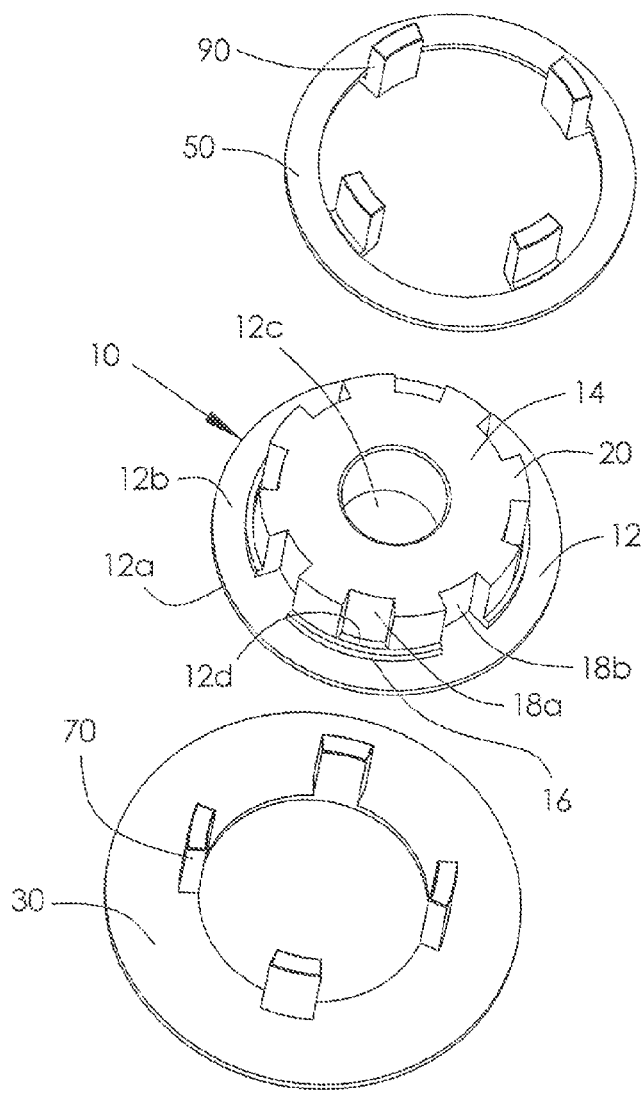
FIG. 2 is an exploded view of the commutator of FIG. 1.
Figure 3:
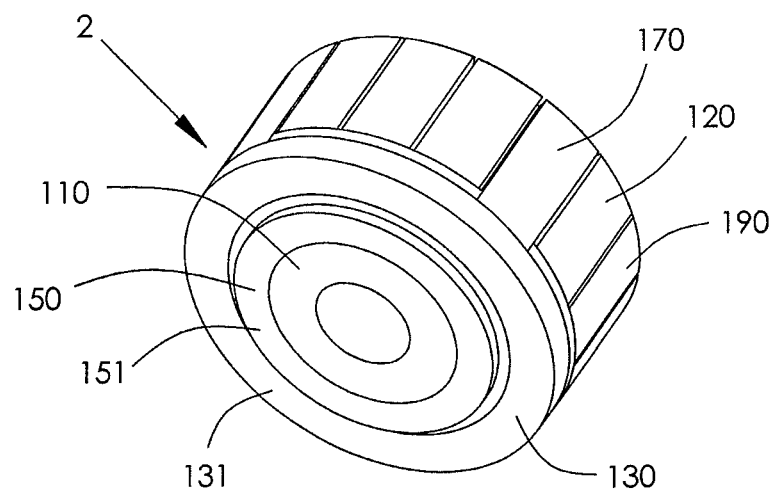
FIG. 3 is a view of a commutator, according to a second embodiment of the present invention, which includes an insulating core and a first slip ring.
Figure 4:
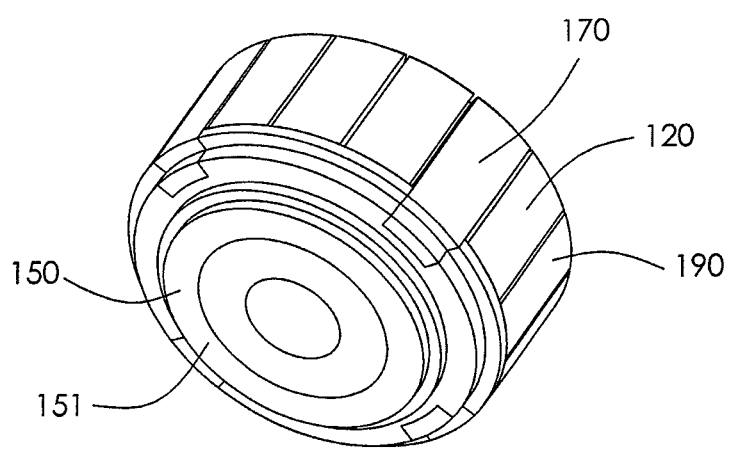
FIG. 4 shows the commutator of FIG. 3, with the first slip ring removed.
Figure 5:
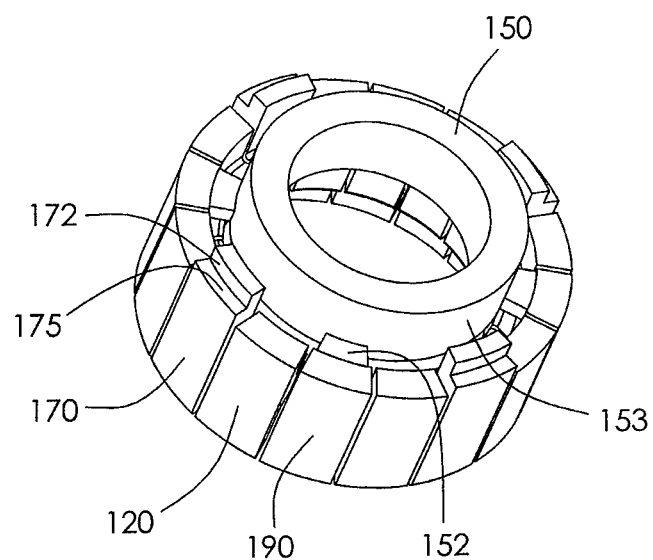
FIG. 5 shows the commutator of FIG. 3, with the first slip ring and the core removed.
Figure 6:
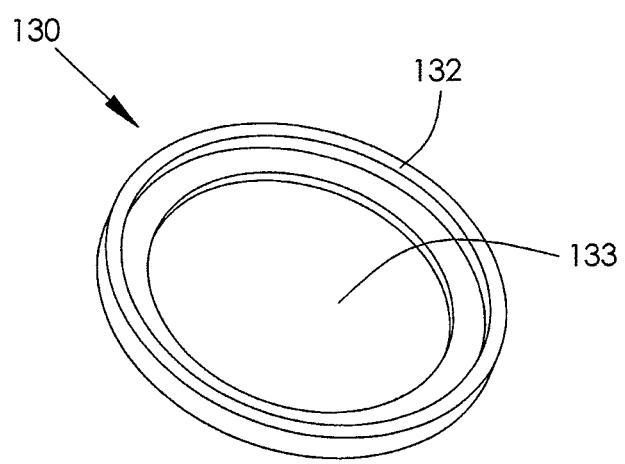
FIG. 6 shows the first slip ring of the commutator of FIG. 3.
Figure 7:
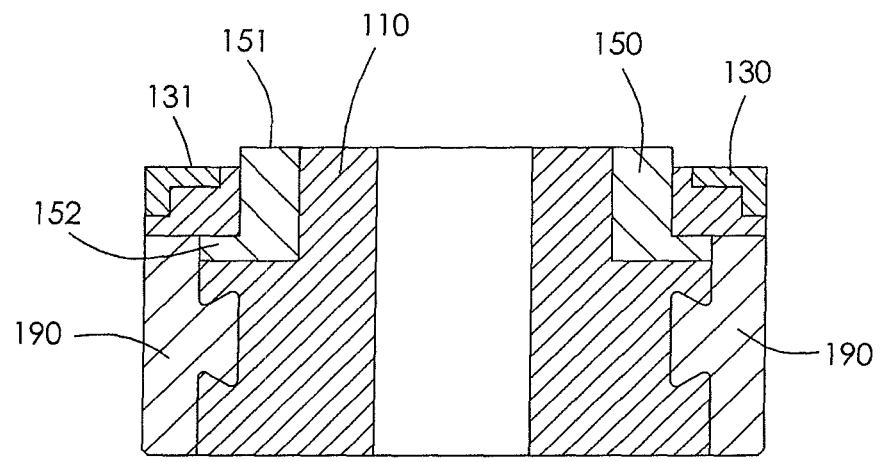
FIG. 7 is a first sectional view of the commutator of FIG. 3.
Figure 8:
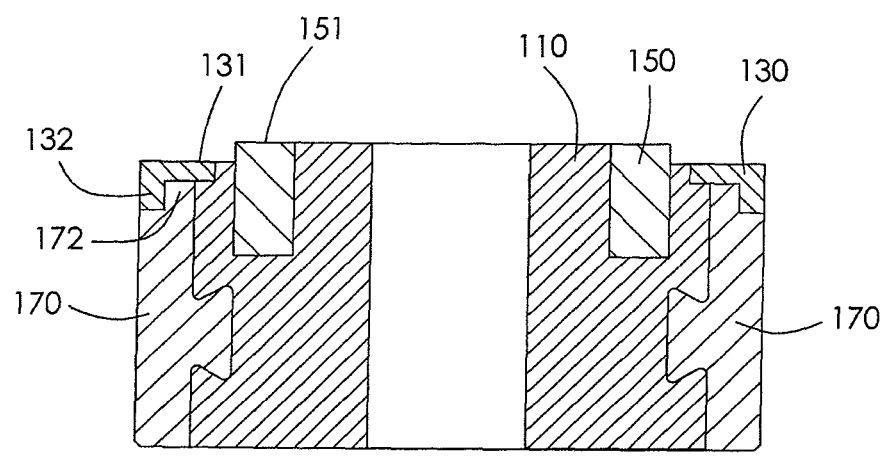
FIG. 8 is a second sectional view of the commutator of FIG. 3.

Referring to FIGS. 1 and 2, a commutator 1 for use in a brush DC motor, according to the first embodiment of the present invention, includes a insulating core 10, a first conductive ring 30, a second conductive ring 50, a number of first commutator bars 70, and a number of second commutator bars 90.

The insulating core 10 includes an plate 12 and a tubular body 14. The plate 12 includes a first surface 12a and a second surface 12b facing away from the first surface 12a. The plate 12 defines a circular through hole 12c at the center thereof to accommodate a shaft of the motor. The plate 12 also defines a number of elongated through holes 12d surrounding the circular through hole 12c. The body 14 extends from the second surface 12b, surrounding the circular through hole 12c. The body 14 includes a number of ribs 20 that equidistantly protrude from the outer surface thereof. Two adjacent ribs 16 and the outer surface of the body 14 cooperatively define a first groove 18a or a second groove 18b. The first grooves 18a and the second grooves 18b are alternately arranged at equally spaced intervals in the circumferential direction of the body 14. The first grooves 18a are exposed to the first surface 12a via a corresponding elongated through hole 12d.

The first conductive ring 30 is disposed on the first surface 12a. The second conductive ring 50 is disposed on the second surface 12b. The first bars 70 are respectively received in the first grooves 18a and extend through the elongated through holes 12d to electrically connect to the first conductive ring 30. The second bars 90 are received respectively in the second grooves 18b and are electrically connected to the second conductive ring 50. As such, the first bar 70 is electrically insulated from the second bar 90 by the ribs 20 and the first conductive ring 30 is electrically insulated from the second conductive ring 50 by the plate 12. The outer surfaces of the first and second bars 70, 90 form a cylindrical contact surface for brushes that are connected to coils of a motor (not shown) to slide on. As the first and second conductive rings 30 and 50 are arranged on the same side of the first and second bars 70 and 90, the commutator 1 is short in the axial direction thereof. A number of ridges 16 are formed on the surface 12b extending between ribs 20 and across grooves 18a to form a lip for the through holes 12d. The ridges 16 form a centering projection for the second conductive ring 50 and ensure that the second conductive ring does not contact the first bars 70. In one embodiment, the plurality of first bars 70 are positioned above the first conductive ring 30 and the plurality of second bars 90 are positioned above the second conductive ring 50 along an axial direction of the commutator. Top surfaces of the plurality of first and second bars 70 and 90 are coplanar along an axial direction of the commutator.

Preferably, the outer diameter of the first conductive ring 30 is greater than that of the second conductive ring 50. In this way, the surfaces of the first and second conductive rings 30 and 50, which are substantially perpendicular to the axis of the commutator and face towards the bars, form top-planar contact surfaces for the brushes that are connected to the DC power source to slide on. In this way, all the brushes are disposed on the side of the plate 12 adjacent the tubular body 14, whereby space utilization is improved. In one embodiment, the top-planar contact surfaces of the first and second conductive rings 30 and 50 are not coplanar with the cylindrical contact surfaces of the plurality of first and second bars 70 and 90. The top-planar contact surface of second conductive ring 50 covers a portion of the top-planar contact surface of the first conductive ring 30.

Preferably, the first bars 70 are integrally formed with the first conductive ring 30 as a single piece stamping. The second bars 90 are integrally formed with the second conductive ring 50 as a single piece stamping. The insulating core 10 is made of plastic and is fixed to the first and second conductive rings 30, 50 and the first and second bars 70, 90 by injection molding. As such, assembly efficiency is improved.

A commutator 2, according to another embodiment, is shown in FIGS. 3 to 8. Each rib 120 of the insulating core 110 is arranged between the first bar 170 and the second bar 190, which is similar to the above mentioned embodiment. The main difference between the commutator 2 and the above mentioned commutator 1 lies in the positional relationship between the first and second conductive rings 130, 150. In the sectional view of FIG. 7, the commutator has been cut through the second bars to show the connection between the second bars and the second conductive ring. Whereas, in the sectional view of FIG. 8, the commutator has been cut through the first bars to show the connection between the first bars and the first ring.

The first conductive ring 130 includes a first contact surface 131 facing away from the first and second bars 170 and 190 and defines a central through hole 133 at the center thereof. The first conductive ring 130 is electrically connected to the first bars 170, for example, by welding, while the second bars 190 are shorter than the first bars 170 in the axial direction of the commutator 2, so that the first conductive ring 130 does not contact the second bars 190. The second conductive ring 150 includes a second contact surface 151 facing away from the first and second bars 170 and 190 and a circular side surface 153 substantially perpendicular to the second contact surface 151. The second conductive ring 150 is received in the central through hole 133 and is electrically insulated from the first conductive ring 130 by the insulating core 110. The second conductive ring 150 is electrically connected to the second bars 190 via a number of connecting bridges 152 arranged between the side surface 153 and the second bars 190. As such, the first contact surface 131 and the second contact surface 151 can be slidably contacted by brushes that extend in the axial direction and are connected to a DC power source.

Preferably, the outer diameter of the first conductive ring 130 is substantially equal to that of a circle formed by the first bars 170, the second bars 190, and the ribs 120. The first conductive ring 130 includes a ring-shaped extension 132 axially extending from the edge thereof. The first bar 170 includes a protrusion 172 axially protruding from an end surface 175 thereof that faces the first conductive ring 130. The protrusions 172 are surrounded and electrically connected to the extension 132, for example by welding.

Alternatively, the first bars 170 may be integrally formed with the first conductive ring 130 as a single piece stamping. The second bars 190 are integrally formed with the second conductive ring 150 as a single piece stamping. The insulating core 110 is made of plastic and is fixed to the first and second conductive rings 130, 150 and the first and second bars 170, 190 by injection molding. As such, assembly efficiency is high.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A commutator comprising:
 a substantially tubular insulating core;
 a first conductive ring fixed to the core;
 a plurality of first bars electrically connected to the first conductive ring;
 a second conductive ring fixed to the core; and
 a plurality of second bars electrically connected to the second conductive ring;
 wherein the first bars and the second bars are fixed to the outer surface of the core and are alternately arranged at equally spaced intervals in the circumferential direction of the core, the first conductive ring and the second conductive ring are arranged on the same side of the all first bars and the all second bars; the first and second conductive rings respectively comprise a top-planar contact surface that is substantially perpendicular to an axis of the commutator and the top-planar contact surface is configured for contacting brushes;

wherein the top-planar contact surfaces of the first and second conductive rings are substantially perpendicular to cylindrical contact surfaces of the plurality of first and second bars.

2. The commutator of claim 1, wherein the first bars are integrally formed with the first conductive ring as a single piece stamping, and the second bars are integrally formed with the second conductive ring as a single piece stamping.

3. The commutator of claim 1, wherein the first conductive ring is spaced from the second conductive ring in the axial direction of the commutator.

4. The commutator of claim 3, wherein the core comprises a and a tubular body substantially perpendicular to the plate relative to a longitudinal axis, the plate is sandwiched between the first and second conductive rings, and the first and second bars are fixed to the outer surface of the tubular body.

5. The commutator of claim 4, wherein the first conductive ring is disposed on a side of the plate that faces away from the tubular body, the second conductive ring is disposed on a side of the plate that faces towards the tubular body, and the first bars pass through the plate to electrically connect to the first conductive ring.

6. The commutator of claim 5, wherein the outer diameter of the second conductive ring is greater than that of a circle formed by the first and second bars, the outer diameter of the first conductive ring is greater than that of the second conductive ring.

7. The commutator of claim 1, wherein the second conductive ring is surrounded by the first conductive ring.

8. The commutator of claim 7, wherein the outer diameter of the first conductive ring is substantially equal to that of a circle formed by the first bars and the second bars.

9. The commutator of claim 7, wherein the first conductive ring comprises a ring-shaped extension axially extending from an edge thereof, the first bars comprise a protrusion axially protruding from an axial end thereof, the protrusions are surrounded by and electrically connected to the extension.

10. The commutator of claim 1, wherein outer surfaces of the first and the second bars form the cylindrical contact surface for contacting brushes.

11. The commutator of claim 1, wherein the top-planar contact surfaces of the first and second conductive rings are not coplanar with the cylindrical contact surfaces of the plurality of first and second bars.

12. The commutator of claim 1, wherein the plurality of first bars are positioned above the first conductive ring, and the plurality of second bars are positioned above the second conductive ring along an axial direction of the commutator.

13. The commutator of claim 1, wherein the top-planar contact surface of the second conductive ring covers a portion of the top-planar contact surface of the first conductive ring.

14. The commutator of claim 1, wherein top surfaces of the plurality of first and second bars are coplanar along an axial direction of the commutator.

* * * * *